US012762631B2

(12) United States Patent
Lu et al.

(10) Patent No.: US 12,762,631 B2
(45) Date of Patent: Oct. 13, 2026

(54) GEOGRAPHICAL RISK HEATMAP BASED ON VARIABLE RISK FACTORS

(71) Applicant: Allstate Insurance Company, Northbrook, IL (US)

(72) Inventors: Marvin Lu, Chicago, IL (US); Sarah K. Webster, Wilmington, NC (US); Leah M. Birch, Somerville, MA (US); Andrew Young, Livingston, NJ (US)

(73) Assignee: Allstate Insurance Company

( * ) Notice: Subject to any disclaimer, the term of this patent is extended or adjusted under 35 U.S.C. 154(b) by 47 days.

(21) Appl. No.: 18/537,022

(22) Filed: Dec. 12, 2023

(65) Prior Publication Data

US 2025/0191091 A1 Jun. 12, 2025

(51) Int. Cl.
*G06Q 50/16* (2024.01)
*G06Q 10/0635* (2023.01)

(52) U.S. Cl.
CPC ......... *G06Q 50/16* (2013.01); *G06Q 10/0635* (2013.01)

(58) Field of Classification Search
CPC ........................... G06Q 50/16; G06Q 10/0635
USPC .......................................................... 705/7.28
See application file for complete search history.

(56) References Cited

U.S. PATENT DOCUMENTS 11,106,706 B1 * 8/2021 Bates .................. G06F 3/04842
11,669,794 B2 * 6/2023 Pourmohammad .......................... G06Q 10/0635 705/7.28
2008/0312942 A1 * 12/2008 Katta .................. G09B 29/006 705/7.34
2014/0278561 A1 * 9/2014 Knuffke ................. G06Q 40/08 705/4
2016/0292752 A1 * 10/2016 Gavriil ................... G06Q 50/16
2020/0314147 A1 * 10/2020 Brannon ............... G06F 16/904
2021/0312351 A1 * 10/2021 Pourmohammad ... G06F 16/906
2022/0028563 A1 * 1/2022 Klasson ................ H04W 4/029
2022/0200839 A1 * 6/2022 Sanger ................... G06Q 10/04
2022/0327447 A1 * 10/2022 Preston .................. G06Q 50/16
2022/0414781 A1 * 12/2022 Mast ........................ G06N 7/01
2023/0143540 A1 * 5/2023 Kenyon-Dean ..... G06F 3/04847 715/771
2023/0259798 A1 * 8/2023 Modugula .............. G06N 5/045 706/10
2024/0155362 A1 * 5/2024 Indrieri ................. H04W 16/18
2024/0161706 A1 * 5/2024 Wanat .................... G09G 3/001
(Continued)

FOREIGN PATENT DOCUMENTS

WO WO-2024227198 A1 * 10/2024 ......... G06F 16/9536

*Primary Examiner* — Abdallah A El-Hage Hassan

(57) ABSTRACT

Implementations described herein provide systems and methods for generating a geographical heatmap based on variable factors. One implementation can include aggregating a plurality of data associated with a geographical location, generating a respective asset for a respective region within the geographical location, associating a respective subset of the plurality of data with the respective asset, determining a respective first type score for a respective first type data, determining a respective second type score for a respective second type data, generating a respective overall score based on the respective first type score and the respective second type score, constructing a map including each of the respective assets, and displaying, as a heatmap, the map with each respective asset.

17 Claims, 4 Drawing Sheets

(56) References Cited

U.S. PATENT DOCUMENTS

| | | | | |
|---|---|---|---|---|
| 2024/0289596 | A1* | 8/2024 | Williams | G06N 3/0475 |
| 2024/0303748 | A1* | 9/2024 | Lovings | G06Q 40/08 |

* cited by examiner

GEOGRAPHICAL RISK HEATMAP BASED ON VARIABLE RISK FACTORS

TECHNICAL FIELD

Aspects of the present disclosure relate to systems and methods for generating geographical risk heatmaps and more particularly to extracting variable risk factors to determine risk scores for precise geographical locations.

BACKGROUND

Climate change results in various new and evolving risks to businesses, homes, and homeowners, such as the increased risk for wildfires, flooding, increasingly powerful and violent storms, rising sea level, degradation of coastal land, extreme weather events, and/or other climate-related risks and catastrophes. These climate-related risks may take property owners by surprise, resulting in property owners experiencing loss or otherwise being unprepared.

It is with these observations in mind, among others, that aspects of the present disclosure were conceived and developed.

SUMMARY

Implementations described and claimed herein address the foregoing by providing systems and methods for generating a geographical heatmap based on variable factors. In one implementation, a method includes aggregating a plurality of data associated with a geographical location, where the plurality of data includes a first type of data associated with a first factor and a second type of data associated with a second factor, where the first type of data is different from the second type of data, and where the first factor is associated with climate conditions, generating, for each respective region within a geographical location, a respective asset for a respective region within the geographical location, associating, for each of the respective assets, a respective subset of the plurality of data with the respective asset, where the respective subset of the plurality of data is associated with the respective region of the geographical location, determining, for each of the respective assets, a respective first type score for a respective first type data in the respective subset of the plurality of data that is of the first type of data, determining, for each of the respective assets, a respective second type score for a respective second type data in the respective subset of the plurality of data in the plurality of data that is of the second type of data, generating, for each of the respective assets, a respective overall score based on the respective first type score and the respective second type score, and constructing, based on each of the respective regions and each of the respective overall scores, a map including each of the respective assets, and where the each of the respective assets is associated with the respective region of the map. The method also includes displaying, as a heatmap, the map with each respective asset, where each respective asset is displayed based on the respective overall score.

In another implementation, the first type of data is indicative of changing climate conditions.

In another implementation, the second type of data is real estate data.

In another implementation, a granularity for each of the respective regions is determined based on the first type of data. A size for each of the respective regions is determined, where each of the respective regions are generated based on the size.

In another implementation, at least one of the respective regions is associated with a home.

In another implementation, the geographical location is a location of a home, and each of the respective regions are associated with at least an object or subdivision of the location.

In another implementation, a set of the respective overall scores is aggregated. An overall region score is generated based on the set of the respective overall scores.

In another implementation, a computing apparatus includes a processor and a memory storing instructions that, when executed by the processor, configure the apparatus to aggregate a plurality of data associated with a geographical location, where the plurality of data includes a first type of data associated with a first factor and a second type of data associated with a second factor, where the first type of data is different from the second type of data, and where the first factor is associated with climate conditions, generate, for each respective region within a geographical location, a respective asset for a respective region within the geographical location, associate, for each of the respective assets, a respective subset of the plurality of data with the respective asset, where the respective subset of the plurality of data is associated with the respective region of the geographical location, determine, for each of the respective assets, a respective first type score for a respective first type data in the respective subset of the plurality of data that is of the first type of data, determine, for each of the respective assets, a respective second type score for a respective second type data in the respective subset of the plurality of data in the plurality of data that is of the second type of data, generate, for each of the respective assets, a respective overall score based on the respective first type score and the respective second type score, and construct, based on each of the respective regions and each of the respective overall scores, a map including each of the respective assets, and where the each of the respective assets is associated with the respective region of the map. The computing apparatus also includes display, as a heatmap, the map with each respective asset, where each respective asset is displayed based on the respective overall score.

In another implementation, a non-transitory computer-readable storage medium, the computer-readable storage medium including instructions that when executed by a computer, cause the computer to aggregate a plurality of data associated with a geographical location, where the plurality of data includes a first type of data associated with a first factor and a second type of data associated with a second factor, where the first type of data is different from the second type of data, and where the first factor is associated with climate conditions, generate, for each respective region within a geographical location, a respective asset for a respective region within the geographical location, associate, for each of the respective assets, a respective subset of the plurality of data with the respective asset, where the respective subset of the plurality of data is associated with the respective region of the geographical location, determine, for each of the respective assets, a respective first type score for a respective first type data in the respective subset of the plurality of data that is of the first type of data, determine, for each of the respective assets, a respective second type score for a respective second type data in the respective subset of the plurality of data in the plurality of data that is of the second type of data, generate, for each of the respective assets, a respective overall score based on the respective first type score and the respective second type score, and construct, based on each of the respective regions and each of the respective overall scores, a map including each of the respective assets, and where the each of the respective assets is associated with the respective region of the map. The non-transitory computer-readable storage medium also includes display, as a heatmap, the map with each respective asset, where each respective asset is displayed based on the respective overall score.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Aspects of the presently disclosed technology generally relate to systems and methods for mitigating climate risk to property on a geographic scale personalized to the land topography, atmospheric conditions, and/or bodies of water or other features that affect climate-related hazard risk. The various systems and methods disclosed herein generally provide for risk awareness and prevention of climate hazards, such that a user can learn about risks personalized to their property and available solutions to mitigate that risk. In particular, the systems and methods disclosed herein provide a user the ability to understand the risks their property faces in the evolving changes to their local climate (especially predicted risks that deviate from historical climate patterns), understand government requirements for climate mitigation (e.g., building codes, etc.), understand available solutions and options, evaluating the options and tradeoffs, finding and managing contractors, and the predicted financial requirements for the climate mitigating protections as applied to their home.

Figure 1:
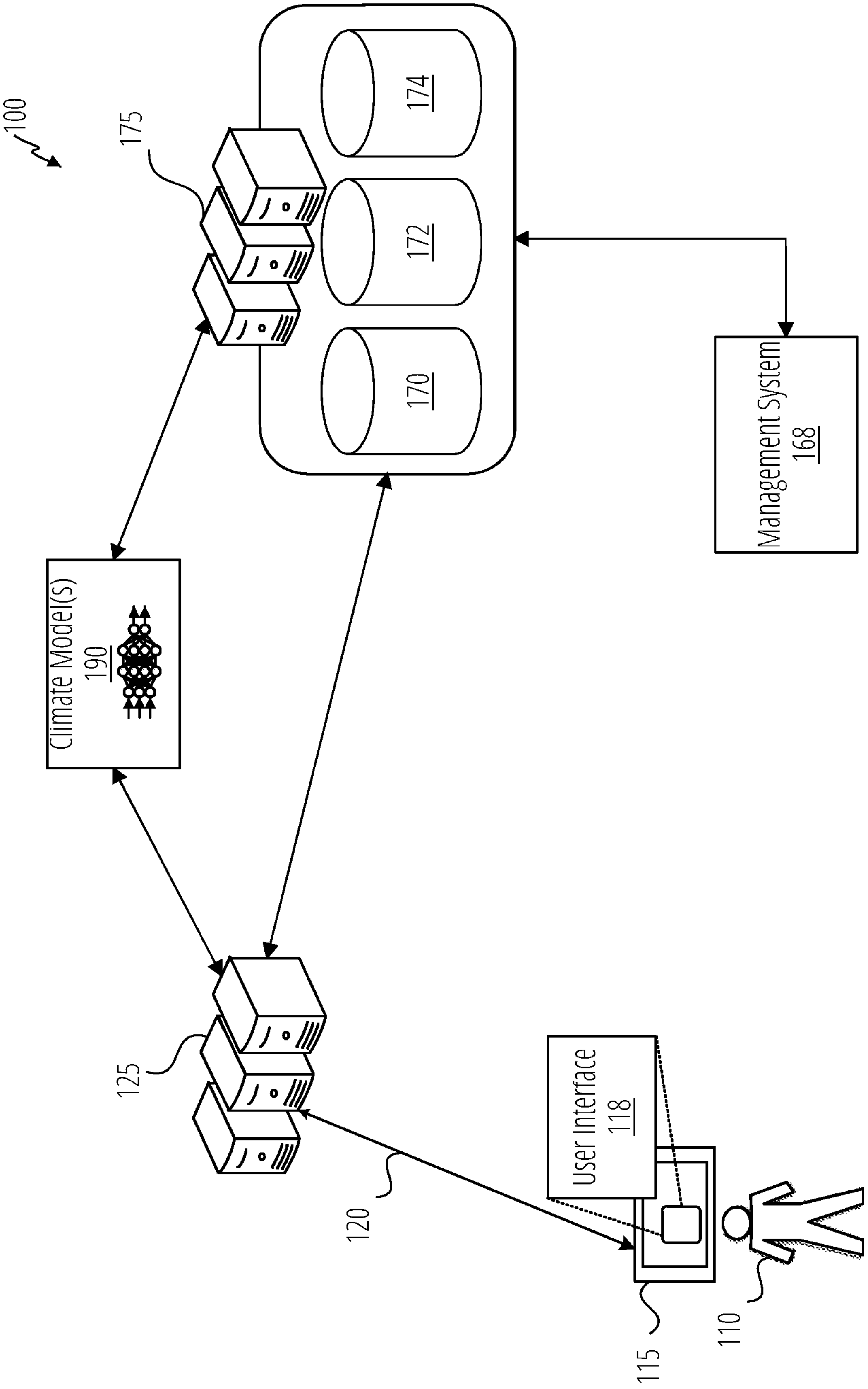
FIG. 1 illustrates an example environment for a climate risk system in accordance with some examples.

To begin a detailed description of an example environment 100 for mitigating long-term climate risk for an area (e.g., particular property of a user), reference is made to FIG. 1. In one implementation, the example environment 100 includes a climate risk advisor 125 that determines environmental forecast factors based on output(s) of one or more predictive climate model(s) 190. The environmental forecast factors can be, in some implementations, environmental conditions applied to a specific area (e.g., home).

In many cases, climate hazards carry a spatial context. While climate is normally thought of as weather conditions prevailing in an area in general or over a long period (e.g., the composite of long-term pattern of weather in a particular area), the weather conditions themselves that arise from climate conditions—e.g., the climate hazards—manifest locally. The direct impacts of physical climate risk thus need to be understood in the context of a geographically defined area, the size of which needs to be determined by contextual factors. There are many variations between the relationship between atmospheric conditions, land topography, and/or bodies of water that impact the risk of specific climate hazards to each spatial context.

As the Earth continues to warm, physical climate risk is ever-changing and non-stationary. Further warming is likely to remain a risk factor for at least the next decade because of physical inertia in the geophysical system. Furthermore, given the thermal inertia of the earth system, some amount of warming will also continue to occur even if net-zero emissions are reached. Socioeconomic impacts are likely to propagate in a nonlinear way as hazards reach thresholds beyond which the affected physiological, human-made, or ecological systems work less well or break down and stop working altogether. Because such systems have evolved or been optimized over time for historical climates, the climate-related risks will have a nonlinear effect on property owners. Moreover, while the direct impact from climate change is spatially local, it can have knock-on effects across regions and sectors through interconnected socioeconomic and financial systems. Property owners will need assistance with understanding climate risks as applied to their personal property, such as the evolving risks they will face due to climate change.

In some examples, the climate risk advisor 125 can determine a severity of the environmental forecast factor on the specific home over a period of time, based on an output from a risk processing service 175. For example, the risk processing service 175 can output a risk score based various different types of data from one or more data source(s) 170, 172, 174. In at least one example, one or more data source(s) 170, 172, 174 can be from third party sources. In at least one example, one or more data source(s) 170, 172, 174 can be sources for different types of data, which can be associated with different factors for determining the risk score. For example, data may include, real estate data corresponding to geographical areas, such as real estate listings from a data source such as a multiple listing service, regional planning data (e.g., city, county, subdivision, etc.), infrastructure data, topological data, zoning data, ownership data, and/or the like.

Techniques and systems for providing a climate risk advisor 125, which can be a service/tool that provides a module and/or application that calculates a property's risk scores based on various factors including environmental peril risks (e.g., flood, wildfire, wind, heat, etc.), synthesized scores, timescales, historical data, etc. In some implementations, the climate risk advisor 125 can provide resources to inform the user of actions that can potentially mitigate some risks caused and/or exacerbated by climate change. For example, the climate risk advisor 125 may identify that shrubbery on a side of the house increases risk of fire damage to the house and inform the user that removing the shrubbery can potentially reduce and/or mitigate the risk of fire damage.

Techniques and systems described herein describe generating a risk score for a particular area based on a predictive analysis by climate model(s) 190. More specifically, the techniques and systems described herein are configured to provide a range of granularity for the area based on different types of variable factors of risk. For example, for more general widespread risks, such as hurricanes or tropical storm, a risk score can be associated with a city or region, while for more localized risks, such as wildfires, the risk score can be associated with buildings, structures, and/or particular parts of a land parcel. A risk metric and/or an associated value metric (e.g., the predicted loss in value of the user's property as a result of changing climate effects) can be determined for the user based on a combination of contextual information within the risk processing service 175 and the environmental forecast factor output from the climate model(s) 190.

In some implementations, the climate model(s) 190 can be numerical models that generate climate predictions based on physical parameterizations of key atmospheric processes. For example, the climate model(s) 190 can be non-hydrostatic models that can be used to study both small-scale and large-scale processes—such as physical phenomena with sizes ranging from meters to 10,000 km or more. In some implementations, the climate model(s) 190 can simulate atmospheric conditions by including a non-hydrostatic formulation that includes the full vertical momentum equation and requires the solution of 3-D elliptic equations for non-hydrostatic pressure perturbation. In some implementations, finite volume techniques can be employed yielding an intuitive discretization and support for the treatment of irregular geometries, such as through the use of orthogonal curvilinear grids and/or shaved cells.

In some implementations, after applying the environmental forecast factor to a specific home associated with user account 170, the climate risk advisor 125 can determine one or more effects of an environmental forecast factor on the specific home over a period of time. The climate risk advisor 125 can then determine risk to the specific home based on the environmental forecast factor. For example, the user 110 may have a home located in an area that, based on predicted climate change conditions for the relevant specific geographic area output from the climate model(s) 190, puts the home at an increased risk for fire at a certain rate over a period of time. This risk is above the historical risk linked to the area's past climate weather patterns. The climate risk advisor 125 can, for example, personalize the accuracy of the climate model(s) 190 prediction by determining an appropriate range for climate predictions, such as determining a bounding box that includes the home and geographic features that affect climate, such as mountain ranges, oceans, rivers, topography relief that impacts wind patterns, or any other topography features that provides climate context. For example, the user's 110 home may be located in a rift valley surrounded on one side by a mountain range. The climate risk advisor 125 can determine a bounding area that includes the rift valley and the mountain range, as those topology features would increase rainfall on one side of the mountain beyond the average of the area in general but decrease the amount of rainfall on the other side. Based on the environmental forecast factor of increased fire risk at the certain rate, the climate risk advisor 125 can identify one or more mitigating actions that mitigates the risk factor—for example, removing shrubbery on a side of the home.

As another example, the user 110 may have a home located in an area that, based on predicted climate change conditions for the relevant specific geographic area output from the climate model(s) 190, puts the home at an increased risk for flooding at a certain rate over a period of time. This risk is above the historical risk linked to the area's past climate weather patterns. The climate risk advisor 125 can, for example, personalize the accuracy of the climate model(s) 190 prediction by determining an appropriate range for climate predictions, such as determining a bounding box that includes the home and geographic features that affect climate, such as mountain ranges, oceans, rivers, topography relief that impacts wind patterns, or any other topography features that provides climate context. For example, the user's 110 home may be located in a rift valley surrounded on one side by a mountain range. The climate risk advisor 125 can determine a bounding area that includes the rift valley and the mountain range, as those topology features would increase rainfall beyond the average of the area in general. Based on the risk factor of increased flooding at the certain rate, the climate risk advisor 125 can identify one or more mitigating actions that mitigates the risk factor and is not within the existing home infrastructure—for example, building drainage areas around the home, planting trees or shrubs to help absorb more rainwater, strengthening foundations and other structural changes to the home that would protect against increased flooding risks. Therefore, the mitigating action can be an identification of one or more infrastructure changes to the specific home to lessen a severity of the risk factor.

A user interface 118 (e.g., application, webpage, etc.) can be dynamically configured on a user device 115, based on the risk metric (or multiple risk metrics), to enable the user 110 to access information about climate risks to a property associated with a user account 170. In some implementations, the user interface 118 can present the identified mitigating actions for the user's 110 home. For example, the user interface 118 can include a layout that is arranged personalized to the specific home. The layout can include property risk information 120, such as the climate risks identified by the climate model(s) 190, and the mitigating actions and/or predicted costs associated with performing the mitigating actions (or the predicted costs if left unprotected) identified by the climate risk advisor 190.

In some implementations, the user interface 118 can arrange tiles on the user interface 118 to personalize a layout to the user 110. Each tile can represent certain climate-related risks particular to a property (such as a home) of the user 110. The tiles may correspond to an applet or booklet personalized for the user. In some implementations, the booklet includes content particular to the climate risks and mitigating actions by the climate risk advisor 125, and/or available grant programs the user 110 can apply for assistance. In some implementations, the applet can be associated with content related to the identified risk to the home and a selected product or service with which the risk can be mitigated, and which can then be displayed on the user interface 118. Based on receiving an indication of an interaction with the tile, an onboarding flow associated with the selected service can be launched. The onboarding flow can be customized for the user 110, the selected mitigating product or service, or both.

In some examples, after the user 110 is presented the mitigating actions (such as a change to their existing home infrastructure), the user 110 may perform the mitigating actions to their home (e.g., building drainage areas around their home). In that case, risk processing service 175 can receive from a data source 170 that a claim has been filed by the user 110 for performing the mitigating actions. In other words, the risk processing service 175 receives claim data that the mitigating action has been performed prior to a climate event associated with the risk factor. As an incentive or reward, the risk processing service 175 can apply an insurance incentive based on the completion of the mitigating action (e.g., lowering rates, etc.).

The user interface 118 (e.g., application, webpage, etc.) can also be configured on a user device 115 to display a risk map, based on the risk scores (or multiple environmental forecast factors), to enable the user 110 to visualize climate risks (e.g., for a property associated with the user). More specifically, the climate risk advisor 125 can aggregate risk scores and generate a heatmap that maps the risk scores to respective geographical regions on a map. The heatmap can identify areas, buildings, objects, and/or other assets that are more risky (e.g., based on the risk scores). For example, one region may have a higher wildfire risk than a second region. Accordingly the heatmap may display the one region as being more risky than the second region (e.g., by providing a legend or gradient of risk and displaying the regions along the gradient accordingly).

Figure 2:
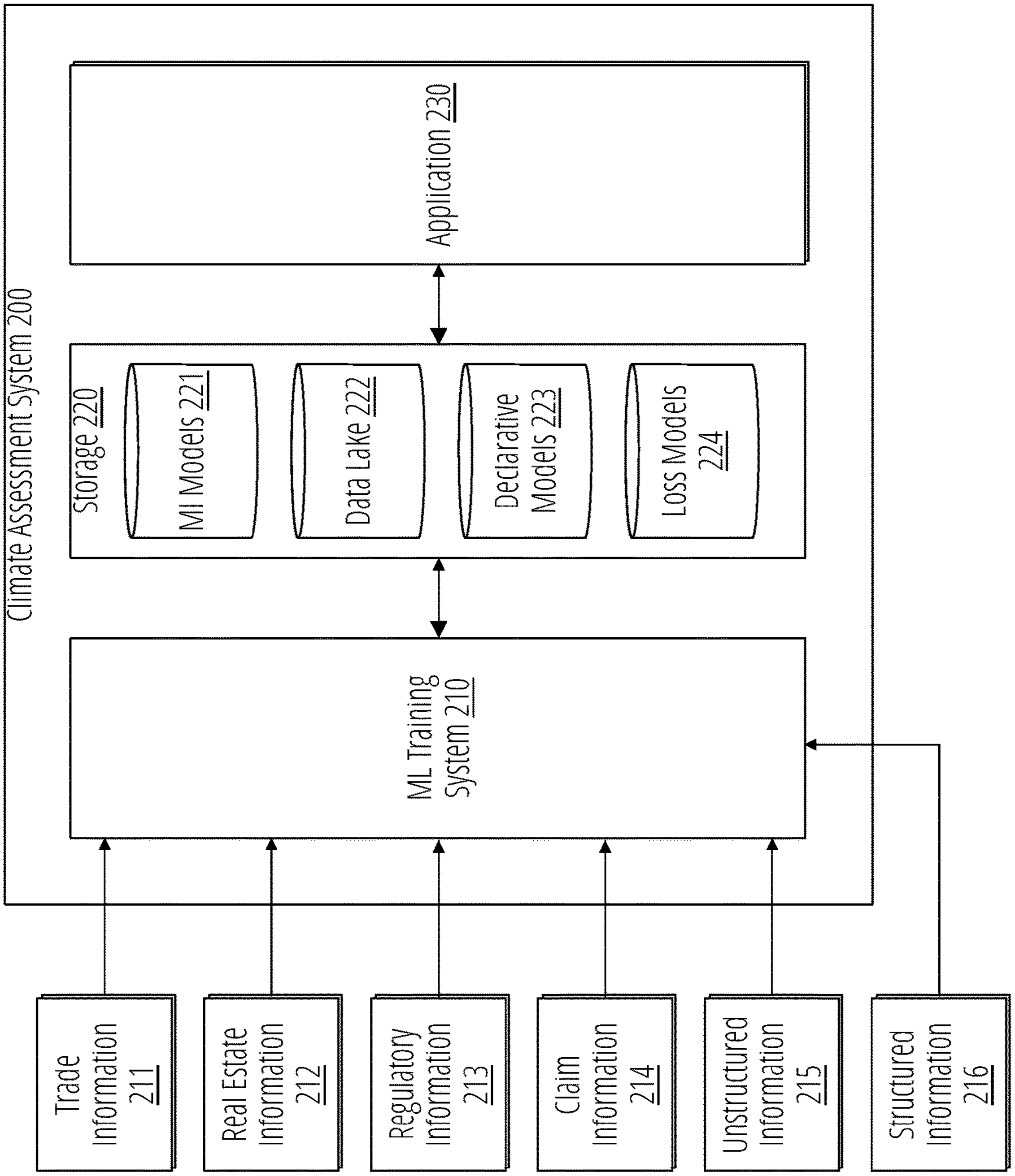
FIG. 2 is a block diagram of a climate risk assessment system in accordance with some examples.

FIG. 2 is a block diagram of a climate risk assessment system 200 in accordance with some aspects of the disclosure. In some aspects, the climate risk climate assessment system 200 includes an ML training system 210, a storage 220, and one or more applications 230. The ML training system 210 is configured to receive various information, such as trade information 211, real estate information 212, regulatory information 213, claim information 214, other unstructured information 215, and various structured information 216. While the disclosure refers to several types of information, one of ordinary skill in the art would understand that a wide variety of variable factors and information can be utilized, additionally and/or alternatively, and that the provided types of information are for discussion and demonstration purposes only.

The trade information 211 comprises various information from trade associations and other interested groups related to building construction, maintenance, energy, and hardening (e.g., the National Association of Home Builders (NAHB), Building Trades Employers Association (BTEA), International Code Council (ICC), etc.). The trade information 211 can include various standards, recommendations, and other content that can be used to identify improvements and modifications to mitigate climate change effects in a particular geolocation. In some cases, the trade information 211 can be used in connection with the supervised training of an ML model.

The real estate information 212 can include various features related to one or more buildings and/or real estate that the ML training system 210 can be trained to estimate damage and other loss for the one or more buildings and/or real estate. For example, MLS information can identify various features that could increase risk (e.g., a hot tub) or decrease risk (a type of roof, pictures that illustrate non-combustible landscaping features, etc.).

The governmental information 213 comprises information from a government agency. For example, an agency may be related to licensing and approving updates and modifications to a building. Accordingly, the agency can approve modifications to existing infrastructure, such as the deployment of superior electrical wiring and panels, and reduce electrical risk. As additional examples, various agencies may record historical climate data, temperature data, moisture data, land data, ocean data, pressure data, atmospheric data, demographic data, incident reports and/or data, among others.

In some aspects, the claim information 214 may be information already possessed by a party or can be provided by another related party, that is related to lifecycle information of a building. Non-limiting examples of claim information 214 include information possessed by an insurer related to a property, information retrieved from another insurer, information received by a policyholder pertaining to the building lifecycle (e.g., a list of receipts identifying various improvements, etc.), and so forth.

Other unstructured information 215 can be provided by various parties. For example, a home inspection agency may report the results of home inspections to an insurer as part of an agreement. In other cases, the insurer may require a potential policyholder to provide the home inspection report in connection with an application process. In other cases, the unstructured information 215 can also be reports from other services, such as a plumber, an electrician, etc.

In some cases, the climate risk assessment system 200 may also receive various structured information 216. In some aspects, the climate risk climate assessment system 200 may receive information from a third-party that is structured and cleaned to remove irrelevant information. For example, a home facts dataset may be offered by a third party and the climate risk climate assessment system 200 can facilitate ML training based on the home facts dataset. In some cases, the structured information can include various objective information, such as a topographical map identifying altitude information of a geography, satellite information identifying terrain and various terrain features (e.g., combustible land features, etc.).

In some cases, the various data sources above may be cleaned using a semi-supervised process or a supervised process. For example, an ML model can be configured to extract information into a structured form or a form with embeddings, and a person can review and modify the extracted information to provide a high-quality dataset for training, evaluation, and/or validation. The training dataset is used to train the ML model, the evaluation dataset is used as a benchmark to identify the quality of the training, and the evaluation dataset is a final benchmark that determines the loss of the ML model.

In some aspects, the ML training system 210 is configured to receive the information and process the information into different content and store the content in the storage system 220. The ML training system 210 can generate a plurality of ML models 221 associated with different functions of the climate risk climate assessment system 200. For example, the ML models 221 can include classifiers to classify a modification to a building, a transformer to understand the relationships of works in unstructured information, and so forth. A non-limiting and illustrative example of ML model is a climate risk assessment model that is configured to receive different types of unstructured information, embeddings, structured content (e.g., maps, etc.), and assess a risk of damage to the building based on geographical information (e.g., terrain, etc.) and climate risk factors (e.g., humidity, rainfall, geography, etc.).

In some aspects, a transformer model includes a multi-layer encoder-decoder architecture. The encoder takes the input text and converts the input text into a sequence of hidden representations and captures the meaning of the text at different levels of abstraction. The decoder then uses these representations to generate an output sequence, such as a text translation or a summary. The encoder and decoder are trained together using a combination of supervised and unsupervised learning techniques, such as maximum likelihood estimation and self-supervised pretraining. Illustrative examples of transformer engines include a Bidirectional Encoder Representations from Transformers (BERT) model, a Text-to-Text Transfer Transformer (T5), biomedical BERT (BioBERT), scientific BERT (SciBERT), and the SPECTER model for document-level representation learning. In some aspects, multiple transformer engines may be used to generate different embeddings.

An embedding is a representation of a discrete object, such as a word, a document, or an image, as a continuous vector in a multi-dimensional space. An embedding captures the semantic or structural relationships between the objects, such that similar objects are mapped to nearby vectors, and dissimilar objects are mapped to distant vectors. Embeddings are commonly used in machine learning and natural language processing tasks, such as language modeling, sentiment analysis, and machine translation. Embeddings are typically learned from large corpora of data using unsupervised learning algorithms, such as word2vec, GloVe, or fastText, which optimize the embeddings based on the co-occurrence or context of the objects in the data. Once learned, embeddings can be used to improve the performance of downstream tasks by providing a more meaningful and compact representation of the objects, irrespective of the source of that object (e.g., images, text, etc.). In some cases, embeddings associated with different ML models (e.g., classifiers, etc.) can be combined based on different techniques.

The ML training system 210 can also be configured to store one or more information within a data lake for later retrieval. For example, the ML training system 210 may store processed information from the trade information 211, the real estate information 212, the regulatory information 213, and the claim information 214. As an example, the claims associated with the property may be stored in the data lake 222. In some aspects, the storage 220 can also store one or more declarative models 223, which are rule-based models for identifying or deducing information. Declarative model 223 can be provided from various sources, for example, the ML training system 210 can include a module configured to generate a declarative model based on the structured information 216.

In some cases, the ML training system 210 is also configured to generate a loss model 224 associated with a building. In some cases, the ML training system 210 can be invoked based on information retrieved from an external party (e.g., a vendor who performs a preventative repair on a roof) and the ML training system 210 may be configured to execute a module to generate the loss model 224 associated with the building. In this case, updates to buildings can be individually modeled and forecasted without requiring a simulation of an entire region.

In some cases, the storage system 220 can use a distributed, immutable data structure that can only be modified based on a one-way binding for some data. An immutable data structure including the one-way binding cannot be modified but can be appended to. For example, the immutable data structure can be facts pertaining to a property, such as initial construction and each appended item of data can correspond to a change within the property. In this way, the immutable data structure can represent a full history of the property and various information pertaining to the property can be surfaced. For example, a construction date of the property can reveal that aspects of the property are more combustible, and minor improvements can address these combustible materials. In some cases, records of the immutable property (e.g., data that represents a fact associated with the property) can be protected by a cryptographic hash to prevent alteration of the immutable data structure. In some cases, the immutable data structure can be distributed to ensure that the data cannot be lost.

The climate risk assessment system 200 can also include various applications 230 that use the various ML model 221, data lake 222, the declarative model 223, and the loss model 224 for various functions. In some aspects, an application can be configured to use the various information to generate an estimate to insure one or more buildings. In another aspect, the application may be related to insurance requirements and is configured to identify whether to offer insurance products within a specific geographic region. In this case, the application can identify potential improvements that can be mandated by the municipality that, if required, would allow the insurer to provide a level of support. In another case, an application 230 may be configured to receive information related to various components of a building, such as information from a modern, connected appliance that monitors and controls the environment. For example, an air register with a sensor that detects airborne particles can identify various factors associated with the house. A thermostat can identify temperature, and based on power consumption, the application may be able to identify potential mitigation remedies.

Other implementations of applications 230 can also be created, and may have varying scopes and use different models, data sets, etc. In one example, the application may be a client-facing application that enables a user to perform hypothetical improvements to identify changes that would provide better protection for the user. The climate risk climate assessment system 200 provides various incentives for policyholders and potential policyholders to be proactive regarding maintenance and improvements to minimize risks of climate change and can enable facilitate insurers to make better decisions to enable property owners to reduce risk and focus on core tasks. As another example, an application may assist city planning by identifying risks in geographic areas, so that city planners can take the risks into account when planning cities.

Figure 3:
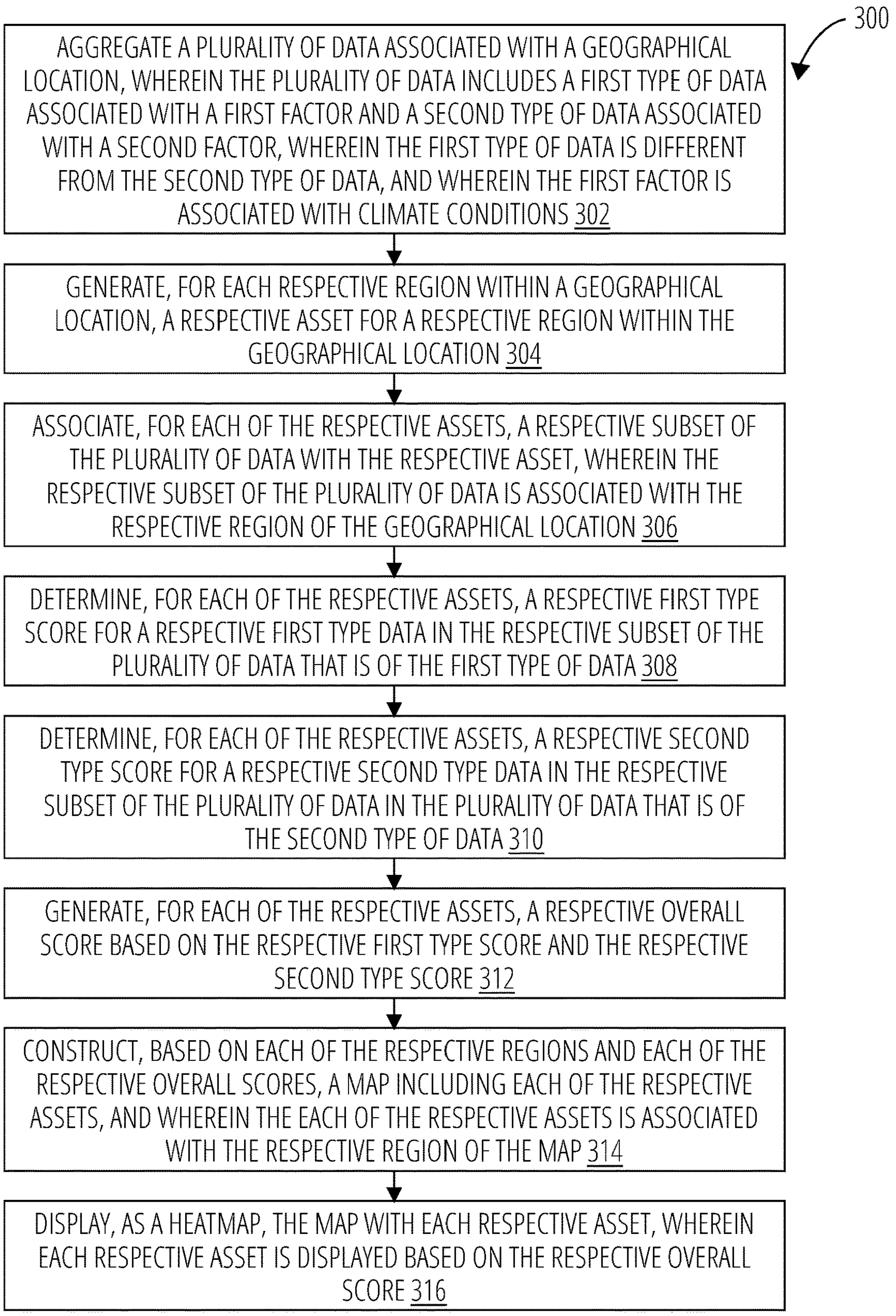
FIG. 3 illustrates an example method for generating a geographical heatmap based on variable factors in accordance with some examples.

FIG. 3 illustrates example operations 300 for generating a geographical heatmap (e.g., a geographical risk heatmap) based on variable factors. Although the example operations 300 depicts a particular sequence of operations, the sequence may be altered without departing from the scope of the present disclosure. For example, some of the operations depicted may be performed in parallel or in a different sequence that does not materially affect the function of the operations 300. In other examples, different components of an example device or system that implements the operations 300 may perform functions at substantially the same time or in a specific sequence.

In operation 302, the computing system may aggregate a plurality of data associated with a geographical location, wherein the plurality of data includes a first type of data associated with a first factor and a second type of data associated with a second factor, wherein the first type of data is different from the second type of data, and wherein the first factor is associated with climate conditions. In some examples, the first type of data is indicative of changing climate conditions. For example, historical data may indicate that annual rainfall has steadily increased over a studied time period. In some examples, the second type of data can be real estate data. For example, a generative ML model can be configured to parse data from a multiple listing service to obtain characteristics of a home.

In operation 304, the computing system may generate, for each respective region within a geographical location, a respective asset for a respective region within the geographical location.

In some examples, the computing system can determine a granularity for each of the respective regions based on the first type of data. For example, storm data may be more consistent over a larger area. Accordingly, the granularity or size of the respective regions may be larger, such that each asset can represent a city block. As another example, wildfire data may be more localized and diverse even across smaller areas, such as a single land parcel. Accordingly, the granularity or size of the respective regions may be smaller, such that each asset can represent a particular location, building, structure, or other object on the land parcel.

Consequently, the computing system determines an appropriate size for the respective regions and generates the respective regions with the determined size. In other words, the computing system determines, based on the granularity, a size for each of the respective regions and each of the respective regions are generated based on the size. For example, one respective region can be associated with a home, while another may be associated with a neighboring home. As another example, the geographical location may be a location of a home and each of the respective regions are associated with an object at the location, a subdivision of the location, a building or structure on the location, etc.

In operation 306, the computing system may associate, for each of the respective assets, a respective subset of the plurality of data with the respective asset, wherein the respective subset of the plurality of data is associated with the respective region of the geographical location.

In operation 308, the computing system may determine, for each of the respective assets, a respective first type score for a respective first type data in the respective subset of the plurality of data that is of the first type of data.

In operation 310, the computing system may determine, for each of the respective assets, a respective second type score for a respective second type data in the respective subset of the plurality of data in the plurality of data that is of the second type of data.

In operation 312, the computing system may generate, for each of the respective assets, a respective overall score based on the respective first type score and the respective second type score.

In operation 314, the computing system may construct, based on each of the respective regions and each of the respective overall scores, a map including each of the respective assets, and wherein the each of the respective assets is associated with the respective region of the map.

In operation 316, the computing system may display, as a heatmap, the map with each respective asset, wherein each respective asset is displayed based on the respective overall score.

In some embodiments, the computing system can aggregate a set of the respective overall scores and generate, based on the set of the respective overall scores, an overall region score. The overall region score can provide a more general identification of the risk for a group of respective regions. The heatmap can also be configured with the overall region score(s) to provide a range of granularity for the geographical region from a more generalized overview of risk for the geographical region to a granular respective overall score for a particular object or structure on a land parcel.

Figure 4:
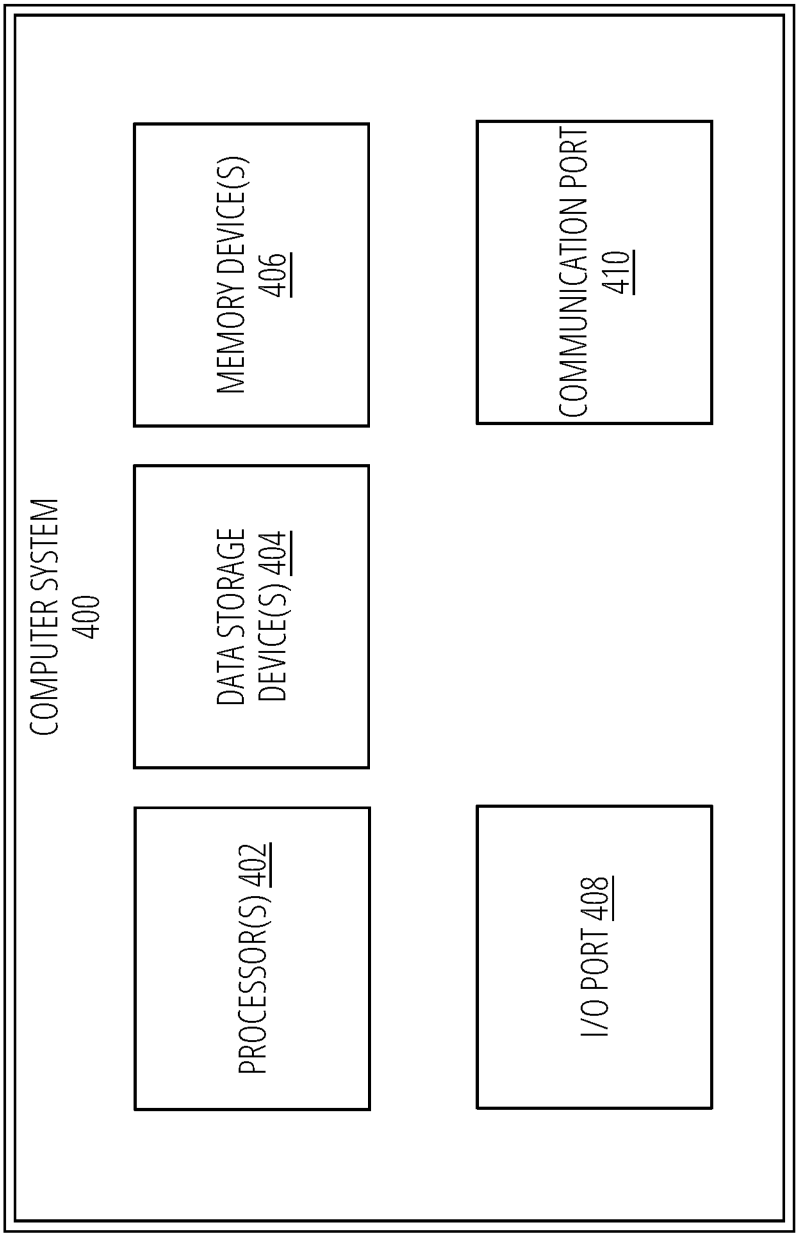
FIG. 4 is an example computing system that may implement various systems and methods discussed herein.

Referring to FIG. 4, a detailed description of an example computing system 400 having one or more computing units that may implement various systems and methods discussed herein is provided. The computer system 400 may be applicable to various devices in the environment 100, such as the user 110, the user device 115, the risk processing service 175 (including each of the sub-components and systems), and/or other computing or network devices. It will be appreciated that specific implementations of these devices may be of differing possible specific computing architectures not all of which are specifically discussed herein but will be understood by those of ordinary skill in the art.

The computer system 400 may be a computing system that is capable of executing a computer program product to execute a computer process. Data and program files may be input to the computer system 400, which reads the files and executes the programs therein. Some of the elements of the computer system 400 are shown in FIG. 4, including one or more hardware processor(s) 402, one or more data storage device(s) 404, one or more memory device(s) 406, and/or one or more 408-410. Additionally, other elements that will be recognized by those skilled in the art may be included in the computer system 400 but are not explicitly depicted in FIG. 4 or discussed further herein. Various elements of the computer system 400 may communicate with one another by way of one or more communication buses, point-to-point communication paths, or other communication means not explicitly depicted in FIG. 4.

The processor(s) 402 may include, for example, a central processing unit (CPU), a microprocessor, a microcontroller, a digital signal processor (DSP), and/or one or more internal levels of cache. There may be one or more processor(s) 402, such that the processor(s) 402 comprises a single central-processing unit, or a plurality of processing units capable of executing instructions and performing operations in parallel with each other, commonly referred to as a parallel processing environment.

The computer system 400 may be a conventional computer, a distributed computer, or any other type of computer, such as one or more external computers made available via a cloud computing architecture. The presently described technology is optionally implemented in software stored on the data storage device(s) 404, stored on the memory device (s) 406, and/or communicated via one or more of the ports 408-410, thereby transforming the computer system 400 in FIG. 4 to a special purpose machine for implementing the operations described herein. Examples of the computer system 400 include personal computers, terminals, workstations, mobile phones, tablets, laptops, personal computers, multimedia consoles, gaming consoles, set top boxes, and the like.

The one or more data storage device(s) 404 may include any non-volatile data storage device capable of storing data generated or employed within the computing system 400, such as computer executable instructions for performing a computer process, which may include instructions of both application programs and an operating system (OS) that manages the various components of the computer system 400. The data storage device(s) 404 may include, without limitation, magnetic disk drives, optical disk drives, solid state drives (SSDs), flash drives, and the like. The data storage device(s) 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 406 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage device(s) 404 and/or the memory device(s) 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 400 includes one or more ports, such as an input/output (I/O) 408 and a communication port 410, for communicating with other computing, network, or vehicle devices. It will be appreciated that the 408-410 may be combined or separate and that more or fewer ports may be included in the computer system 400.

The I/o port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computer system 400 via the I/o port 408. Similarly, the output devices may convert electrical signals received from computer system 400 via the I/o port 408 into signals that may be sensed as output by a human, such as sound, light, and/or touch. The input device may be an alphanumeric input device, including alphanumeric and other keys for communicating information and/or command selections to the processor(s) 402 via the I/o port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 400 via the I/o port 408. For example, an electrical signal generated within the computer system 400 may be converted to another type of signal, and/or vice-versa. In one implementation, the environment transducer devices sense characteristics or aspects of an environment local to or remote from the computer system 400, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computer system 400, such as, physical movement of some object (e.g., a mechanical actuator), heating or cooling of a substance, adding a chemical substance, and/or the like.

In one implementation, a communication port 410 is connected to a network by way of which the computer system 400 may receive network data useful in executing the methods and systems set out herein as well as transmitting information and network configuration changes determined thereby. Stated differently, the communication port 410 connects the computer system 400 to one or more communication interface devices configured to transmit and/or receive information between the computing computer system 400 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 410 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 410 may communicate with an antenna or other link for electromagnetic signal transmission and/or reception.

In an example implementation, climate modeling and mitigation software and other modules and services may be embodied by instructions stored on the data storage device(s) 404 and/or the memory device(s) 406 and executed by the processor(s) 402.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for generating a geographical heatmap based on variable factors, the method comprising:

aggregating a plurality of data associated with a geographical location, wherein the plurality of data includes a first type of data associated with a first factor, the first factor associated with climate conditions, and a second type of data associated with a second factor, wherein the first type of data is different from the second type of data, wherein aggregating the plurality of data includes receiving climate prediction data from a non-hydrostatic climate model configured to simulate atmospheric conditions using physical parameterizations of atmospheric processes;

generating, for each respective region within the geographical location, a respective asset for a respective region within the geographical location;

determining, based on the first type of data, a granularity for each of the respective regions based on climate risk characterizations, wherein determining the granularity for each of the respective regions includes determining a bounding box for the geographical location based on geographic features affecting climate conditions;

determining, based on the granularity, a size for each of the respective regions, wherein each of the respective regions are generated based on the size, and wherein the granularity is dynamically determined based on a type of climate risk;

associating, for each of the respective assets, a respective subset of the plurality of data with the respective asset, wherein the respective subset of the plurality of data is associated with the respective region of the geographical location;

determining, for each of the respective assets, a respective first type score for a respective first type data in the respective subset of the plurality of data that is of the first type of data;

determining, for each of the respective assets, a respective second type score for a respective second type data in the respective subset of the plurality of data in the plurality of data that is of the second type of data;

generating, for each of the respective assets, a respective overall score based on the respective first type score and the respective second type score, wherein generating the respective overall score includes processing the respective subset of the plurality of data along with climate prediction data from the climate model to determine risk for the respective asset; and constructing, based on each of the respective regions and each of the respective overall scores, a map including each of the respective assets, and wherein each of the respective assets is associated with the respective region of the map; and displaying, as a heatmap, the map with each respective asset, wherein each respective asset is displayed based on the respective overall score.

2. The method of claim 1, wherein the first type of data is indicative of changing climate conditions.

3. The method of claim 1, wherein the second type of data is real estate data.

4. The method of claim 1, wherein at least one of the respective regions is associated with a home.

5. The method of claim 1, wherein the geographical location is a location of a home, and wherein each of the respective regions is associated with at least one of an object or subdivision of the location.

6. The method of claim 1, further comprising:

aggregating a set of the respective overall scores; and generating, based on the set of the respective overall scores, an overall region score.

7. A computing apparatus comprising:

a processor; and a memory storing instructions that, when executed by the processor, configure the apparatus to:

aggregate a plurality of data associated with a geographical location, wherein the plurality of data includes a first type of data associated with a first factor, the first factor associated with climate conditions, and a second type of data associated with a second factor, wherein the first type of data is different from the second type of data;

generate, for each respective region within a geographical location, a respective asset for a respective region within the geographical location;

determine, based on the first type of data, a granularity for each of the respective regions based on climate risk characterizations, wherein determining the granularity for each of the respective regions includes determining a bounding box for the geographical location based on geographic features affecting climate conditions;

determine, based on the granularity, a size for each of the respective regions, wherein each of the respective regions are generated based on the size and wherein the granularity is dynamically determined based on a type of climate risk;

associate, for each of the respective assets, a respective subset of the plurality of data with the respective asset, wherein the respective subset of the plurality of data is associated with the respective region of the geographical location;

determine, for each of the respective assets, a respective first type score for a respective first type data in the respective subset of the plurality of data that is of the first type of data;

determine, for each of the respective assets, a respective second type score for a respective second type data in the respective subset of the plurality of data in the plurality of data that is of the second type of data;

generate, for each of the respective assets, a respective overall score based on the respective first type score and the respective second type score, wherein generating the respective overall score includes processing the respective subset of the plurality of data along with climate prediction data from a climate model to determine risk for the respective asset; and construct, based on each of the respective regions and each of the respective overall scores, a map including each of the respective assets, and wherein each of the respective assets is associated with the respective region of the map; and render for display, as a heatmap, the map with each respective asset, wherein each respective asset is displayed based on the respective overall score.

8. The computing apparatus of claim 7, wherein the first type of data is indicative of changing climate conditions.

9. The computing apparatus of claim 7, wherein the second type of data is terrain data.

10. The computing apparatus of claim 7, wherein at least one of the respective regions is associated with a home.

11. The computing apparatus of claim 7, wherein the geographical location is a location of a home, and wherein each of the respective regions is associated with at least one of an object or subdivision of the location.

12. The computing apparatus of claim 7, wherein the instructions further configure the apparatus to:
- aggregate a set of the respective overall scores; and
- generate, based on the set of the respective overall scores, an overall region score.

13. A non-transitory computer-readable storage medium, the computer-readable storage medium including instructions that when executed by a computer, cause the computer to:
- aggregate a plurality of data associated with a geographical location, wherein the plurality of data includes a first type of data associated with a first factor, the first factor associated with climate conditions, and a second type of data associated with a second factor, wherein the first type of data is different from the second type of data, wherein aggregating the plurality of data includes receiving climate prediction data from a climate model;
- generate, for each respective region within a geographical location, a respective asset for a respective region within the geographical location;
- determine, based on the first type of data, a granularity for each of the respective regions based on climate risk characterizations, wherein determining the granularity for each of the respective regions includes determining a bounding box for the geographical location based on geographic features affecting climate conditions;
- determine, based on the granularity, a size for each of the respective regions, wherein each of the respective regions are generated based on the size and wherein the granularity is dynamically determined based on a type of climate risk;
- associate, for each of the respective assets, a respective subset of the plurality of data with the respective asset, wherein the respective subset of the plurality of data is associated with the respective region of the geographical location;
- determine, for each of the respective assets, a respective first type score for a respective first type data in the respective subset of the plurality of data that is of the first type of data;
- determine, for each of the respective assets, a respective second type score for a respective second type data in the respective subset of the plurality of data in the plurality of data that is of the second type of data;
- generate, for each of the respective assets, a respective overall score based on the respective first type score and the respective second type score, wherein generating the respective overall score includes processing the respective subset of the plurality of data along with climate prediction data from the climate model to determine risk for the respective asset; and
- construct, based on each of the respective regions and each of the respective overall scores, a map including each of the respective assets, and wherein each of the respective assets is associated with the respective region of the map; and
- display, as a heatmap, the map with each respective asset, wherein each respective asset is displayed based on the respective overall score.

14. The computer-readable storage medium of claim 13, wherein the first type of data is indicative of changing climate conditions.

15. The computer-readable storage medium of claim 13, wherein the second type of data is real estate data.

16. The computer-readable storage medium of claim 13, wherein at least one of the respective regions is associated with a home.

17. The computer-readable storage medium of claim 13, wherein the geographical location is a location of a home, and wherein each of the respective regions is associated with at least one of an object or subdivision of the location.

* * * * *